Oct. 11, 1960   R. G. CRAIG   2,956,092
REMOVAL OF ISOBUTENE FROM BUTADIENE
Filed Oct. 17, 1956
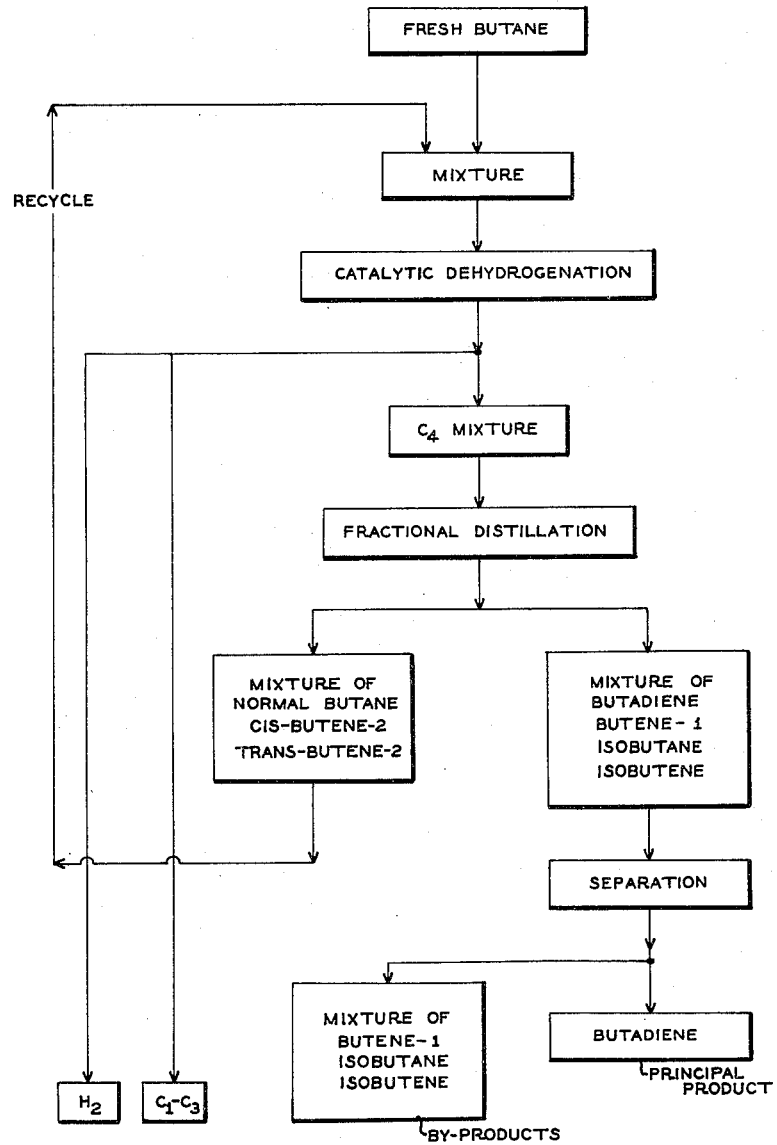
INVENTOR
ROBERT G. CRAIG
BY John R. Ewbank,
ATTORNEY United States Patent Office 2,956,092
Patented Oct. 11, 1960

2,956,092

REMOVAL OF ISOBUTENE FROM BUTADIENE

Robert G. Craig, Wilmington, Del., assignor to Houdry Process Corporation, Wilmington, Del., a corporation of Delaware Filed Oct. 17, 1956, Ser. No. 616,393

Claims priority, application Great Britain Oct. 17, 1955

3 Claims. (Cl. 260—680)

This invention relates to the manufacture of butadiene and is concerned particularly with the prevention of difficulties attributable to iso-$C_4$ compounds.

Because the boiling point of isobutane is about 18° F. lower than normal butane, it is not difficult to obtain technical grades of normal butane containing less than about 6% isobutane. However, commercial methods do not readily permit the preparation of butane containing less than a few parts per billion of isobutane. The manufacture of butadiene from technical normal butane necessarily involves the problems incident to the presence of trace amounts of isobutane in the feed. During many years of butadiene manufacture, the iso-$C_4$ compounds were deemed to be of no great significance. In the development of the present invention, the surprising discoveries were made: that the iso-$C_4$ compounds especially favor coke formation; that the presence of iso-$C_4$ compounds in the reaction stream (especially concentrations greater than about 3%) decreases the butadiene production because of the diluent effect, because of coke formation, and because of other factors; that the chromia on alumina dehydrogenation catalyst serves as an isomerization catalyst whereby exhaustive recycling of butenes could lead to a concentration of about 5% iso-$C_4$ hydrocarbons in the reactant stream if the butane feed were absolutely free from iso-$C_4$ hydrocarbons, or about 30% iso-$C_4$ hydrocarbons if the butane feed were contaminated with about 4% isobutane; and that attempts at removal of iso-$C_4$ hydrocarbons from either the butane-butenes recycle stream or from the products involve the same kind of cost limitations which make it necessary to employ a butane feed containing more than 1 ppb of isobutane but less than 5% isobutane.

In accordance with the present invention, a technical grade of butene-1 is withdrawn as a by-product of the dehydrogenation reaction, and only the butane and butenes-2 are recycled for butadiene production. Substantially all iso-$C_4$ hydrocarbons in the $C_4$ effluent from the catalytic zone are withdrawn as minor contaminants in the butene-1, thus preventing any significant accumulation of iso-$C_4$ compounds in the reaction stream. Whether the butane feed contains little or much (e.g., 4%) iso-$C_4$ hydrocarbons matters little in the process of the present invention because the quantity present in the feed (plus any resulting from isomerization phenomena) is substantially equal to the quantity present in the withdrawn butene-1 product. Substantially all the isobutane and isobutene in the $C_4$ effluent from the catalytic zone are entrained as contaminants in the butene-1 stream withdrawn as a by-product. The solubility and volatility characteristics of isobutane and isobutene resemble those of butene-1 so much more than they do those of cis-butene-2, trans-butene-2 and/or normal butane that it is feasible to achieve an effective separation of the iso-$C_4$ hydrocarbons from the recycle stream.

Butene-1 is valuable as a component for the manufacture of butadiene, and cannot be marketed at a price competitive with butadiene. In order to remove only small traces of iso-$C_4$ compounds, it is necessary to sacrifice (by marketing at a relatively unattractive price) quantities of butene-1 many times greater than the quantities of iso-$C_4$ compounds thus removed. Surprisingly, however, the improvement in butadiene yields resulting from the removal of iso-$C_4$ compounds from the recycle stream is sufficient to make the marketing of technical grades of butene-1 as a by-product commercially attractive. Moreover, such disposal of isobutane and isobutene as a contaminant in technical grades of butene-1 is more profitable under typical engineering conditions than alternative arrangements for the complete elimination of iso-$C_4$ compounds from the recycle stream of butenes-2 and butane. To the extent that the butene-1 is employed for making alkylate gasoline, the presence of isobutene and/or isobutane as contaminants in the butene-1 is not a serious handicap.

Numerous procedures are available for treating the $C_4$ effluent from the catalytic zone to recover butadiene as the principal product stream, to recover butene-1 (contaminated with substantially all of the isobutene and isobutane present in the $C_4$ effluent from the catalytic zone) as a by-product stream, and to separate a recycle stream substantially free from isobutene and isobutane, said recycle stream containing a substantial portion of the normal butane, cis-butene-2 and trans-butene-2 present in the $C_4$ effluent from the catalytic zone, the present invention being concerned only with the composition of said three streams and not with the procedure for separating the $C_4$ effluent from the catalytic zone into said three streams.

The figure is a flowsheet showing the flow of the various hydrocarbon streams through the system of the present invention.

As an example of the present invention, a technical grade of butane may be mixed with a recycle stream and pumped at a pressure of about 200 mm. through a bed of chromia on gamma alumina catalyst preheated to 1150° F. at a rate of about 1.5 volumes of liquid $C_4$ hydrocarbons per volume of catalyst per hour, forming about 37% by volume (about 1.9% by weight) hydrogen, minor amounts of a $C_1$–$C_3$ hydrocarbon fraction, minor amounts of a $C_5$+ cut and a predominant amount of $C_4$ hydrocarbons. The $C_4$ effluent from the catalytic zone can be separated by suitable combinations of steps such as solvent extraction, extractive distillation, and distillation, to provide a predominant amount of recycle stream, a significant amount of butadiene product stream, and a butene-1 by-product stream containing isobutane and isobutene as contaminants.

Data are set forth relating to a unit designed to produce about 20,000 tons per year of high-purity butadiene together with about 26,125 tons per year of a technical grade of butene-1. It is convenient to refer to the flow rates per hour in terms of pounds, it being understood that the quantities relate to the pounds per hour. Thus such a unit produces 5,249 pounds of butadiene and 6,856 pounds of butene-1 from a reactant stream of 59,956 pounds. About 19,571 pounds of normal butane are mixed with 40,385 pounds per hour of a recycle stock consisting of 26,190 pounds of butane, 13,919 pounds of butene-2 and 276 pounds of butadiene. This reactant stream is passed through the dehydrogenation zone to produce a mixture comprising about 1,141 pounds of hydrogen, 781 pounds of methane, 901 pounds of ethane, 901 pounds of propane, about 180 pounds of pentane and higher hydrocarbons, and about 1,441 pounds of carbonaceous deposit together with 53,448 pounds of $C_4$ hydrocarbons consisting of 5,525 pounds of butadiene, 26,724 pounds of butane and 21,199 pounds of a mixture of butene-1 and butene-2. The gas stream from the dehydrogenating zone is treated to recover the $C_4$ hydrocarbons. A stream of $C_4$ hydrocarbons at the rate of about 52,490 pounds per hour (representing about 98% recovery) is sent to a distillation tower from the bottom of which there is removed a recycle stream consisting on a per hour basis of about 26,190 pounds of butane, 13,919 pounds of butene-2 and about 276 pounds of butadiene. Of particular importance, this recycle stream is substantially free from traces of isobutane and/or isobutene. There is recovered overhead from the distillation tower a stream which contains per hour about 5,249 pounds of butadiene and about 6,856 pounds of a mixture consisting predominantly of butene-1 but containing substantially as much isobutane and isobutene as was the isobutane content of the butane feed stock. The overhead stream from the distillation tower can be subjected to any appropriate extraction procedure for the recovery of butadiene and for the preparation of a technical grade of butene-1. For many of the industrial uses for butene-1, such as in the manufacture of alkylate gasoline, the presence of the minor amount of isobutene and isobutane as contaminants is not significantly disadvantageous. By reason of the careful preparation of the recycle stock to exclude significant amounts of isobutane and isobutene, it is possible to utilize as feed stocks materials which are rich in butane but which contain amounts of isobutane which would normally be quite unsatisfactory for butadiene manufacture.

Obviously many modifications and variations of the invention as hereinbefore set forth may be made without departing from the spirit and scope thereof and therefore only such limitations should be imposed as are indicated in the appended claims.

What is claimed is:

1. The method of dehydrogenating butane which consists of: preparing a mixture of a recycle stream and fresh butane feed; subjecting said mixture to dehydrogenation at an elevated temperature in the presence of a dehydrogenation catalyst to prepare a catalytic $C_4$ effluent consisting essentially of butane, cis-butene-2, trans-butene-2, isobutane, isobutene, butene-1, and butadiene; separating a fraction containing substantially all of the butane, cis-butene-2 and trans-butene-2 in said $C_4$ effluent for recirculation as said recycle stream, said recycle stream being substantially free from isobutane and isobutene; separating and withdrawing as the most valuable product of the process a stream of butadiene; and separating and withdrawing as a by-product of the process a stream of butene-1 containing substantially all of the isobutane and isobutene in said $C_4$ effluent.

2. In the method of manufacturing butadiene by the catalytic dehydrogenation in a common reaction zone of a mixture of a recycle stream and a stream of technical normal butane, in which the $C_4$ effluent from said reaction zone consists essentially of butane, cis-butene-2, trans-butene-2, isobutane, isobutene, butene-1 and butadiene and said butadiene is recovered as a principal product, the improvement which consists of preventing the accumulation of isobutane and isobutene in the recycle stream returned to said common reaction zone effected by withdrawing substantially all of the isobutane and isobutene present in the $C_4$ effluent from the reaction zone by entrainment of said isobutane and isobutene in the stream of butene-1, substantially all of the butene-1 present in said $C_4$ effluent from the catalytic zone being withdrawn as a by-product of said butadiene manufacture.

3. The method of preparing butadiene from normal butane which includes the steps of: mixing a stream of fresh normal butane with a stream of recycle $C_4$ hydrocarbons; passing the thus prepared mixture through a bed of hot dehydrogenation catalyst granules to prepare an effluent comprising hydrogen, $C_1$–$C_3$ hydrocarbons and $C_4$ hydrocarbons; separating the $C_4$ hydrocarbons, said $C_4$ hydrocarbons consisting of butadiene, butene-1, normal butane, cis-butene-2, trans-butene-2, isobutane and isobutene; fractionally distilling the $C_4$ hydrocarbons to separate a low-boiling recycle stream consisting essentially of normal butane, cis-butene-2 and trans-butene-2, said recycle stream being substantially free from isobutane and isobutene, and a high boiling fraction consisting essentially of butadiene, isobutane, isobutene and butene-1; separating from said high boiling fraction a stream of butadiene and withdrawing said butadiene stream as the principal product; and separating and withdrawing as a by-product a stream of butene-1 containing all of the isobutane and isobutene in said effluent from the catalyst bed.

References Cited in the file of this patent

UNITED STATES PATENTS

| 2,395,016 | Schulze et al. | Feb. 19, 1946 |
| 2,396,854 | Jones | Mar. 19, 1946 |
| 2,414,962 | Mattox | Jan. 28, 1947 |
| 2,750,435 | Fetchin | June 12, 1956 |